_United States Patent Office_

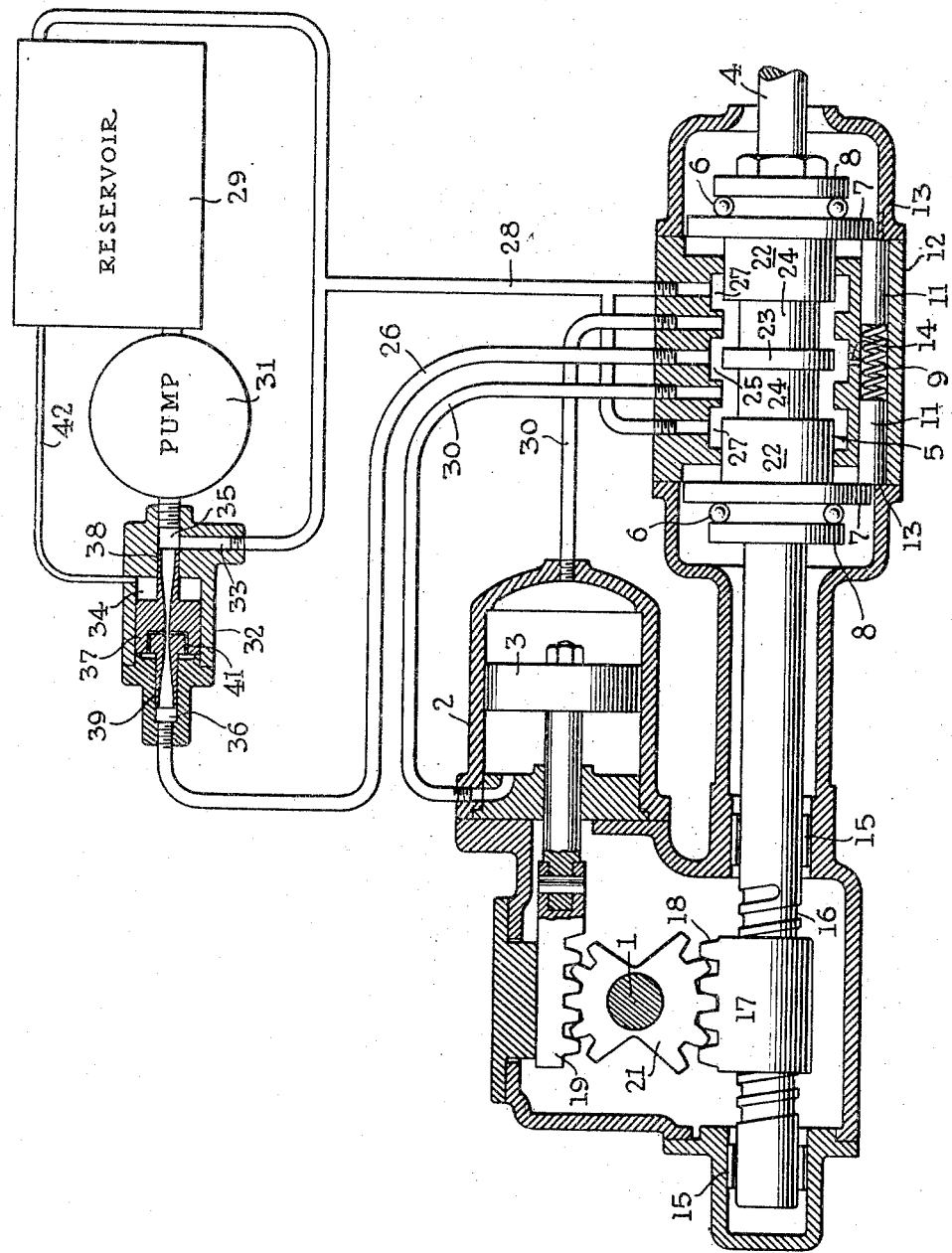

2,823,690
Patented Feb. 18, 1958

2,823,690

SECONDARY UNLOADER FOR PUMP SYSTEMS

Parker Dodge, Chevy Chase, Md., assignor to The New York Air Brake Company, a corporation of New Jersey Application July 20, 1953, Serial No. 369,057

5 Claims. (Cl. 137—108)

This invention relates to supplemental unloading means for interposition between a continuously running pump and an open-center control valve such as those used in automobile steering gears and serving automatically to unload the pump additionally and locally whenever the system is unloaded through the open-center path in the control valve, and to terminate local unloading whenever the open-center unloading path is throttled or closed, as it is when the steering gear is being moved.

Systems of this sort are desirable for use on vehicles where parasite power is derived from a pump driven by the vehicle propelling motor. Variations of speed of the propelling motor entail variations of pump speed and so introduce serious control problems which the invention overcomes. Utility of the device is, however, not dependent on variable pump speed.

A very active field of use of the invention is in hydraulic power steering of light passenger automobiles, for in such installations the service requirements are particularly severe, as to power consumption, silence and freedom from heating.

In application Serial No. 342,647, filed March 16, 1953, M. W. Huber describes a device which has demonstrated ability to operate at low pressure and low temperature, and with a remarkably close approach to silence.

The device about to be described has aspects of similarity to the Huber device, but avails of the useful characteristic of a venturi-passage to minimize throttling and attendant energy losses, and to modify the control characteristics so as to afford control of the rate at which the local unloading valve shifts, without, however, imparting graduating characteristics.

To relate the invention to one contemplated environment it will be illustrated as included in the circuit illustrated in Fig. 9 (pg. 40) of an article entitled, "Hydraulic steering in General Motors cars" by C. W. Lincoln which appeared at pages 35–45—vol. 6—Proceedings—8th National Conference on Industrial Hydraulics (copyright 1952 by National Conference on Industrial Hydraulics). This article describes what is commercially known as the Saginaw Steering Gear.

The single figure shows the local unloading valve of the invention interposed in such a typical hydraulic circuit.

In the drawings the main elements of the Saginaw steering gear will first be identified.

The cross-shaft or pitman shaft 1 carries the arm or pitman (not shown) which is connected by a conventional linkage to the steering knuckles (not shown). The double-acting motor 2 with piston 3 is the booster motor. The shaft 4 is the steering shaft and carries the steering wheel (not shown). It passes axially through the bore of the tubular piston valve 5 and turns freely relatively thereto, but is capable of moving the valve axially by means of two ball thrust bearings 6 each confined between a flange 7 on the valve and a flange 8 on the shaft 4. Obviously the trust bearings are opposed to one another.

Springs 9 (only one of which is visible) react between plungers 11 guided in ways formed in the valve housing 12. Each plunger-end engages both a flange 7 and a shoulder 13 on a part of the housing. The effect is to bias the valve 5 to its mid-position but to permit longitudinal motions of the valve against spring resistance in either direction. The springs 9 are mounted under a degree of compression which determines the limit of force exerted by manual effort, and consequently the steering load at which the motor 2 takes over. The port 14 is provided to permit hydraulic pressure liquid to react on the ends of plungers 11 and assist springs 9, so that in the higher ranges of hydraulic actuation the centering forces on valve 5 increase and extend the range of "feel" imposed on the steering effort.

The shaft 4 is mounted in needle bearings 15 and may move axially against the reactions of plungers 11. The shaft has a rather quick pitch thread 16 on which a nut 17 is mounted. The nut is held against rotation by guiding means not visible in the drawing and carries a toothed rack 18. Opposed to the rack 18 is a toothed rack 19 guided to move in a path parallel with the axis of shaft 4. Between the racks and meshing with each is a double sector gear 21 so dimensioned that the nut 17 has a slightly larger force ratio than piston 3 with respect to shaft 1.

The valve 5 has end lands 22 spaced from a narrow middle land 23 by grooves 24, and the cylindrical seat in which the valve is reciprocable has three port grooves, namely, the inlet groove 25 connected with the pressure line 26 and two exhaust grooves 27 each connected with exhaust line 28 which leads to the reservoir 29. Between the inlet groove 25 and each of the exhaust grooves 27 are ports leading to respective motor connections 30. In the Saginaw gear as illustrated a pump 31 draws hydraulic liquid (oil) from reservoir 29 and continuously delivers it to line 26.

The mechanism so far described is in commercial use and since the valve generally indicated at 5 is of the open-center type an unloader for pump 31 is theoretically not necessary. In the neutral position shown in the drawing the system is unloaded by flow which branches from port 25 through grooves 24 to ports 27. Displacement of the valve loads the pump, unbalances the motor piston 3 and produces follow-up booster action having remarkably fine characteristics.

In power steering systems it is desirable to use a small charge of hydraulic liquid and to attain a close approximation to silence. Long pipe lines are apt to be noisy and energy losses may cause heating effects which become increasingly serious as the liquid charge is reduced in volume.

Hence efforts have been made to cause the loading and unloading effected by an open-center valve such as 5 to pilot an unloader which is local to the pump, and which partially unloads the pump through a much shorter path. The local unloader must not completely unload the pump, for if it did, then the loading action of the open-center valve would be without effect.

The purpose of the present invention is to improve the local unloader in three respects:

(1) To minimize energy losses caused by eddying, sudden changes of velocity or direction, and shocks.

(2) To afford an "off" and "on" characteristic to local unloading, so that when local unloading is active its effect is uniform, not graduated.

(3) To delay shifts between "off" and "on" in local unloading only to the extent necessary to keep shock effects within tolerable limits. Delay entails a sort of graduation of unloading flow. To attain these objectives loading springs are avoided, and the shift is timed by flow through a restricted orifice. This gives uniformity of shift and permits timing so close that graduation is virtually eliminated, without reaching the objectionable alternative of shock.

Between the outlet of pump 31 and the pressure line 26 is interposed the housing 32 of the local unloader. This has an unloading passage 33 to which a branch of line 28 is connected.

The housing 32 encloses a relatively large cylinder 34 with two coaxial and smaller cylindrical bores 35 and 36 at its opposite ends. The pump discharge leads to the end of bore 35 and line 26 leads from the end of bore 36.

A piston 37 is reciprocable in cylinder 34 and has opposite plunger extensions 38, 39 which work in bores 35 and 36 respectively. A venturi passage leads axially through piston 37 and its opposite extensions 38 and 39. At least one restricted port 41 (two are shown) leads from the throat of the venturi passage to the interior of cylinder 34 at the left of piston 37. The space within cylinder 34 to the right of the piston 37 is vented, preferably to atmosphere. A convenient arrangement is to lead a vent line 42 to reservoir 29 above the liquid level. Then if any oil is discharged through 42 (as the result of leakage into the cylinder) it will be returned to the system. When the piston 37 is to the left as shown, extension 38 exposes unloading passage 33, but when the piston is to the right the port is closed by extension 38.

When the pump is running and valve 5 is in mid-position the piston 37 moves to the position shown and unloads the pump partly but not completely through passage 33. This is attributable to the high flow velocity through the venturi which produces a sub-atmospheric static pressure at the throat and in passages 41. Since the cylinder 34 is subject to atmospheric pressure in the reservoir, a net force will be developed across piston 37 which moves the piston and the extension 38 to the left. If the flow through line 26 is resisted by motion of valve 5 to one or another of its steering positions, back pressure on the venturi reduces the flow velocity through the venturi and consequently raises the static pressure at the throat and in passages 41. When this pressure becomes super-atmospheric, the net force across piston 37 will act in the reverse direction and the piston will move extension 38 to the right closing the unloading passage 33.

The rate at which piston 37 will move is controlled by the size of passages 41. It would usually be designed so as to move as fast as is practicable, without objectionable shock, but the significant thing is that the rate of shift can be controlled.

A moment's consideration of the parts 32—42 will make it clear that the unloader comprises an unloader passage, a valve to open and close the passage, a piston motor having a double-acting movable abutment connected to move the valve between its two functional positions, a venturi passage in the flow path from the pump to the open-center valve, a restricted flow connection subjecting one area of the movable abutment to the static pressure at the venturi throat and another flow connection subjecting the other area of the movable abutment to a source of constant pressure. A further consideration of the description will reveal that when the two areas of the double-acting abutment are equal, this constant pressure must be intermediate the maximum and minimum static pressures at the venturi throat in order for the piston 37 to move in reverse directions. Stated more generally, the constant pressure must be related to the range of pressure variation at the venturi throat in such a way that the force exerted on the right-hand side of piston 37 is intermediate the maximum and minimum forces exerted on the left-hand side of said piston.

While the illustrated arrangement is the most compact and is preferred for that reason, it is only one of several possible arrangements. It is not necessary, for example that the venturi passage lead through the motor piston, but such an arrangement shortens the ports 41 and leads to a light and symmetrical structure.

What is claimed is:

1. The combination of a pump; means defining a venturi-passage through which the pump discharges, and a restricted control passage communicating with the throat of the venturi-passage; a pump unloader shiftable freely between a loading and an unloading position; an expansible chamber motor comprising a working space in communication with said control passage and a movable motor element connected with said unloader; means for exerting a constant force on said unloader in opposition to the force exerted by the expansible chamber motor; and valve means controlling flow from said venturi-passage and operable to modify back pressure on the venturi-passage through a range sufficient to cause the motor and the constant force means to move the unloader between its two limiting positions.

2. An unloading valve for interposition between a continuously-running pump and an open-center controlling valve, comprising a housing having an inlet for connection to pump discharge and an outlet for connection to the open-center controlling valve; means defining within said housing a flow path between said inlet and outlet comprising a venturi-passage; means defining an unloading passage leading from said pump discharge; valve means controlling said unloading passage and shiftable between positions in which, respectively, it opens and closes said unloading passage; a differential pressure motor having two opposed movable abutments equal in area and both connected with said valve means, one being subject to the pressure head in the throat of the venturi-passage and acting in a valve-closing direction; and means for subjecting the opposed movable abutment to a constant pressure intermediate the maximum and minimum head pressures at the venturi throat.

3. An unloading valve for interposition between a continuously-running pump and an open-center controlling valve, comprising a housing having an inlet for connection to pump discharge and an outlet for connection to the open-center controlling valve; means defining within said housing a flow path between said inlet and outlet comprising a venturi-passage; means defining an unloading passage leading from said pump discharge; valve means controlling said unloading passage and shiftable between positions in which, respectively, it opens and closes said unloading passage; motor means connected to shift said valve means and comprising a cylinder with a free, double-acting piston having one piston area subject to the pressure head in the venturi throat and acting in a valve-closing direction; and means for subjecting the other piston area to a constant pressure whose magnitude is such that the force exerted by this piston area is intermediate the maximum and minimum forces exerted by said one piston area.

4. A valve as defined in claim 3 in which the venturi-passage extends longitudinally through the double-acting piston.

5. An unloading valve for interposition between a continuously-running pump and an open-center controlling valve, comprising a housing having an inlet for connection to pump discharge and an outlet for connection to the open-center controlling valve; means defining within said housing a flow path between said inlet and outlet comprising a venturi-passage; means defining an unloading passage leading from said pump discharge; valve means controlling said unloading passage and shiftable between positions in which, respectively, it opens and closes said unloading passage; a pressure motor having two opposed movable abutments both connected with said valve means, one of said abutments being subject to the pressure head in the venturi throat and acting in a valve-closing direction; and means for subjecting the other movable abutment to a constant pressure whose value is such that the force exerted by this abutment is intermediate the maximum and minimum forces exerted by said one abutment.

References Cited in the file of this patent

UNITED STATES PATENTS

| | | |
|---|---|---|
| 2,212,833 | Huber | Aug. 27, 1940 |
| 2,241,665 | Herman | May 13, 1941 |
| 2,280,128 | Price | Apr. 21, 1942 |
| 2,397,043 | Pudge | Mar. 19, 1946 |